United States Patent
Song et al.

(10) Patent No.: US 11,700,221 B2
(45) Date of Patent: Jul. 11, 2023

(54) RULE-BASED ANNOTATION SERVICE IN A CLOUD PLATFORM

(71) Applicant: Honeywell International Inc., Morris Plains, NJ (US)

(72) Inventors: Denny Song, Beijing (CN); Adam Gibson, Sunnybank (AU); Ashley Noble, South Hobart (AU)

(73) Assignee: Honeywell International Inc., Charlotte, NC (US)

( * ) Notice: Subject to any disclaimer, the term of this patent is extended or adjusted under 35 U.S.C. 154(b) by 323 days.

(21) Appl. No.: 15/982,192

(22) Filed: May 17, 2018

(65) Prior Publication Data

US 2019/0356622 A1 Nov. 21, 2019

(51) Int. Cl.
| | | |
|---|---|---|
| *H04L 51/212* | (2022.01) | |
| *H04L 67/10* | (2022.01) | |
| *H04L 51/18* | (2022.01) | |
| *H04L 51/08* | (2022.01) | |
| *H04L 67/568* | (2022.01) | |

(52) U.S. Cl.
CPC ............ *H04L 51/212* (2022.05); *H04L 51/08* (2013.01); *H04L 51/18* (2013.01); *H04L 67/10* (2013.01); *H04L 67/568* (2022.05)

(58) Field of Classification Search
CPC ..... H04L 51/12; H04L 67/10; H04L 67/2842; H04L 51/08; H04L 51/18
See application file for complete search history.

(56) References Cited

U.S. PATENT DOCUMENTS

| | | | |
|---|---|---|---|
| 10,255,043 B2* | 4/2019 | Al-Fuqaha | ................ G06F 8/41 |
| 10,614,021 B1* | 4/2020 | Banks | .................. G06Q 20/027 |
| 2003/0115291 A1 | 6/2003 | Kendall et al. | |
| 2003/0131069 A1 | 7/2003 | Lucovsky et al. | |
| 2004/0181544 A1* | 9/2004 | Anderson | ............. G06F 16/289 |
| 2005/0228981 A1* | 10/2005 | Gavrilov | ................. H04L 63/08 |
| | | | 713/100 |
| 2006/0106840 A1* | 5/2006 | Rooney | ................... H04L 67/26 |
| 2006/0265489 A1 | 11/2006 | Moore | |

(Continued)

OTHER PUBLICATIONS

Cplusplus, "Operators;" http://www.cplusplus.com/doc/tutorial/operators/ 2010 (Year: 2010).*

(Continued)

*Primary Examiner* — John A Follansbee
*Assistant Examiner* — Fadi Haj Said
(74) *Attorney, Agent, or Firm* — Bookoff McAndrews, PLLC

(57) ABSTRACT

Systems and methods are disclosed for subscribing to messages generated from a plurality of edge devices. One method comprises receiving, at a cloud platform from a plurality of edge devices, a plurality of messages that comply with a common schema and receiving, at the cloud platform from a custom application, an annotation stream request to generate at least one annotation stream and an annotation filter request to generate one or more annotation filters. The at least one annotation stream and the one or more annotation filters are then generated by the cloud platform. Based on the one or more filters, one or more of the plurality of messages are published, by the cloud platform, to the at least one annotation stream.

16 Claims, 7 Drawing Sheets

(56) References Cited

U.S. PATENT DOCUMENTS

| | | | |
|---|---|---|---|
| 2009/0241170 A1* | 9/2009 | Kumar | H04L 47/10 |
| | | | 726/3 |
| 2010/0333167 A1* | 12/2010 | Luo | H04L 63/1441 |
| | | | 706/14 |
| 2011/0225306 A1* | 9/2011 | Delsesto | H04W 4/24 |
| | | | 709/227 |
| 2016/0112487 A1* | 4/2016 | Wang | H04L 67/32 |
| | | | 709/201 |
| 2017/0099332 A1* | 4/2017 | Bullotta | H04L 67/02 |
| 2017/0126517 A1* | 5/2017 | Crabtree | H04L 41/145 |
| 2018/0152340 A1* | 5/2018 | Johnson | H04L 41/082 |
| 2019/0028746 A1* | 1/2019 | Inzerillo | H04L 65/605 |
| 2019/0094827 A1* | 3/2019 | Park | G05B 15/02 |
| 2019/0108071 A1* | 4/2019 | Cyr | G06F 16/29 |
| 2019/0162438 A1* | 5/2019 | Fokou | F24F 11/56 |
| 2019/0208032 A1* | 7/2019 | Sivasubramanian | |
| | | | H04L 1/1614 |
| 2019/0280932 A1* | 9/2019 | Gazzetti | H04L 41/0896 |

OTHER PUBLICATIONS

Alam, Sarfraz, Chowdhury, Mohammad M. R., Noll, Josef, "SenaaS: An event-driven sensor virtualization approach for Internet of Things cloud;" Nov. 25, 2010, https://ieeexplore.ieee.org/abstract/document/5678060 (Year: 2010).*

E-Security Partner; "Partner Sales Guide"; E-Security Confidential; Winter 2002; 107 pp.

\* cited by examiner

RULE-BASED ANNOTATION SERVICE IN A CLOUD PLATFORM

TECHNICAL FIELD

The present disclosure relates to methods and systems for a computer-implemented electronic messaging annotation service. More particularly, the present disclosure relates to methods and systems for subscribing to messages generated by various edge devices connected to a cloud platform, by creating a customized annotation stream and filters.

BACKGROUND

As Internet of Things (IoT) technology is starting to transform the way devices and facilities are managed, the added convenience comes at a cost due to an increasing number of devices being connected to the IoT network every day. IoT technology continues to generate an enormous amount of data, and as the number and types of devices in the IoT network grow, the strain on networks and processing resources continues to grow.

IoT platforms are often implemented in the "cloud" (i.e., via a network, such as the Internet), which provides a pathway for the data generated by the IoT devices to travel to various destinations. As such, an annotation service is one of the most important features of the cloud-based IoT platform. The annotation service enables various devices at remote locations to share and exchange message-based data with the IoT platform and enables the IoT platform to perform analytics and other device-related functions based on the collected data, such as device or building maintenance and management. However, the messages generated by the devices often do not have a consistent format, and the processing burden on the IoT platform becomes greater as the number of messages with varying content schemas increases with the growing number of connected devices. This problem further makes subscribing to specific, user-desired messages more difficult, as the message formats become inconsistent and unpredictable.

Therefore, there is a need for a flexible annotation subscription service based on a standardized annotation schema.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE INVENTION

One embodiment provides a computer implemented method for subscribing to messages generated from a plurality of edge devices, the method comprising: receiving, at a cloud platform from a plurality of edge devices, a plurality of messages that comply with a common schema; receiving, at the cloud platform from a custom application, an annotation stream request to generate at least one annotation stream and an annotation filter request to generate one or more annotation filters; generating, by the cloud platform, the at least one annotation stream and the one or more annotation filters; and publishing, by the cloud platform, one or more of the plurality of messages to the at least one annotation stream based on the one or more annotation filters.

One embodiment provides a system for subscribing to messages generated from a plurality of edge devices. The system may comprise one or more processors; and a non-transitory computer readable medium storing instructions that, when executed by the one or more processors, cause the one or more processors to perform a method comprising: receiving, at a cloud platform from a plurality of edge devices, a plurality of messages that comply with a common schema; receiving, at the cloud platform from a custom application, an annotation stream request to generate at least one annotation stream and an annotation filter request to generate one or more annotation filters; generating, by the cloud platform, the at least one annotation stream and the one or more annotation filters; and publishing, by the cloud platform, one or more of the plurality of messages to the at least one annotation stream based on the one or more annotation filters.

One embodiment provides a non-transitory computer readable medium for subscribing to messages generated from a plurality of edge devices. The non-transitory computer readable medium may store instructions that, when executed by one or more processors, cause the one or more processors to perform a method comprising: receiving, at a cloud platform from a plurality of edge devices, a plurality of messages that comply with a common schema; receiving, at the cloud platform from a custom application, an annotation stream request to generate at least one annotation stream and an annotation filter request to generate one or more annotation filters; generating, by the cloud platform, the at least one annotation stream and the one or more annotation filters; and publishing, by the cloud platform, one or more of the plurality of messages to the at least one annotation stream based on the one or more annotation filters.

BRIEF DESCRIPTION OF THE DRAWINGS

Embodiments of the invention will now be described, by way of example only, with reference to the accompanying drawings in which.

DETAILED DESCRIPTION

Figure 1:
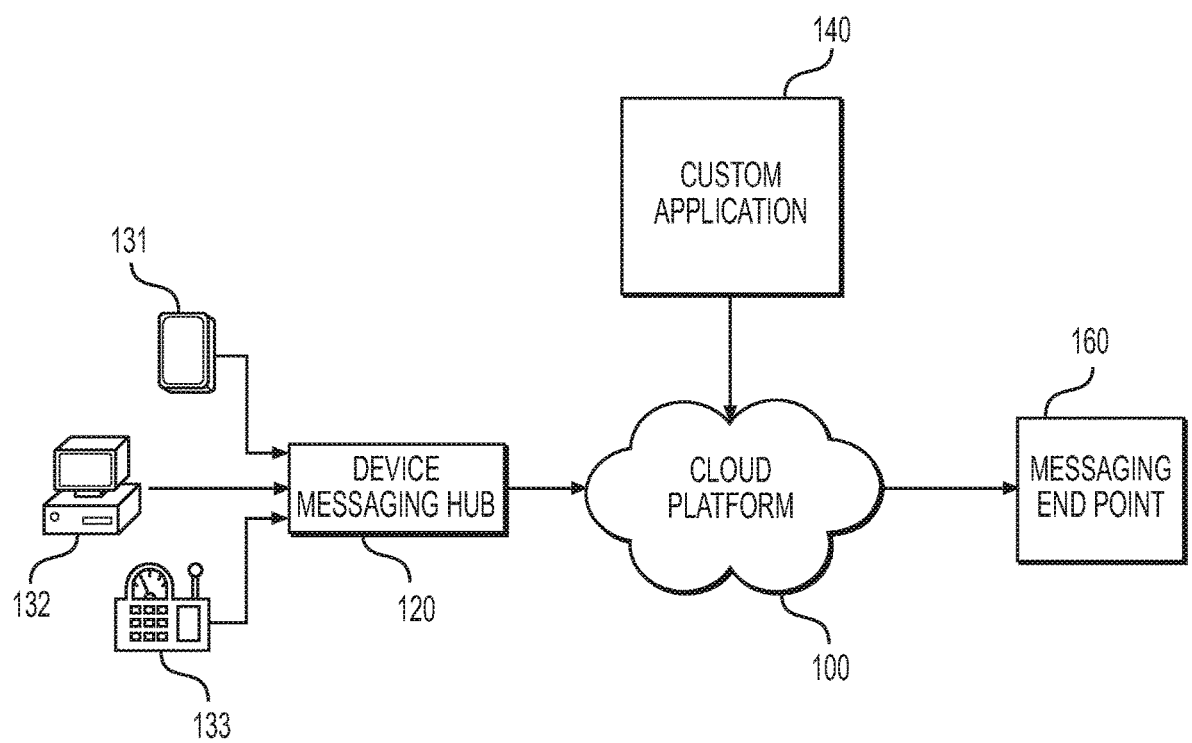
FIG. 1 is an exemplary embodiment of an annotation service network.

The following embodiments describe systems and methods for subscribing to messages generated from a plurality of edge devices connected to a cloud platform, by generating a customized annotation stream and filters using the custom application.

Typically, different types of edge devices connect to the cloud platform and transmit messages of varying schemas to the cloud platform. This can make it difficult to implement a subscription service that is flexible and extensible enough to subscribe to messages coming from a variety of sources (e.g., edge devices).

Therefore, in an exemplary embodiment, the present disclosure is directed to systems and methods for enabling all, or at least a plurality of, messages that are accepted by the cloud platform to comply with a common schema so that the custom application may subscribe to messages coming from various sources. The custom application may call a web application programming interface (API) of the cloud platform to request a stream and filters to be generated for message delivery. The use of the web API makes the subscription process more accessible and adaptable by the requesting entities (e.g., the custom application, and users of the custom application). The custom application may be configured to subscribe to all, or at least a plurality of, messages from all sources connected to the cloud platform. The filters may be subjected to an authorization process prior to being added or associated with the corresponding streams, to ensure the custom application only subscribes to messages that the custom application is permitted to access. The filters may be simple filters and/or combination filters, and may include properties, values, and/or operators to identify messages to be delivered. Further, the custom application may specify a messaging end point in the stream request such that the desired messages will be delivered to a desired target destination.

It will be apparent, to one skilled in the art, that the present disclosure may be practiced without some or all of these specific details. In other instances, well known process operations have not been described in detail in order not to unnecessarily obscure the present disclosure.

Subject matter will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended reflect or indicate that the embodiment(s) is/are "example" embodiment(s). Subject matter be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The terms "comprise," "include," "have" and any variations thereof are used synonymously to denote or describe non-exclusive inclusion. As such, a process, method, article, or apparatus that uses such terms does not include only those steps, structure or elements but may include other steps, structures or elements not expressly listed or inherent to such process, method, article, or apparatus.

Further, the terms "first," "second," and the like, herein do not denote any order, quantity, or importance, but rather are used to distinguish one element from another. Moreover, the terms "a" and "an" herein do not denote a limitation of quantity, but rather denote the presence of at least one of the referenced item. As noted above, the term "exemplary" is used in the sense of "example," rather than "ideal."

Referring now to the appended drawings, FIG. 1 shows an exemplary embodiment of an annotation service network. At the center of the annotation service network is a cloud platform 100. In general, FIG. 1 depicts a device messaging hub 120, a custom application 140, and a messaging end point 160, all disposed in communication with cloud platform 100.

As shown in FIG. 1, device messaging hub 120 may be disposed in communication with a plurality of edge devices 131, 132, 133. Thus, the cloud platform 100 may be disposed in communication with multiple edge devices 131, 132, 133, each of which may comprise a communication module that enables a wired or wireless connection to the cloud platform 100 via device messaging hub 120. The edge devices 131, 132, 133, may include sensors, actuators, and/or other devices that act as entry points to the annotation service network and exchange data with the cloud platform 100. In one embodiment, the edge devices 131, 132, 133, may send or publish messages to the cloud platform 100 that are further processed and analyzed by the cloud platform 100, which will be described in detail in the following sections. In another embodiment, the edge devices 131, 132, 133, may have the processing capacity to process and analyze data locally, instead of or in addition to in the cloud platform 100. Device messaging hub 120 may be a cloud gateway device that enables the edge devices 131, 132, 133 and the cloud platform 100 to bi-directionally communicate with each other. The cloud platform 100 may also be disposed in communication with a custom application 140, which may be implemented on any device configured for exchanging data communications over the annotation service network with the cloud platform 100. The annotation service network may also include a messaging end point 160 which is connected to the cloud platform 100 over the network. The messaging end point 160 may also be connected to the custom application 140 and/or the edge devices 131, 132, 133, over the network. In one embodiment, the messaging end point 160 may be configured to receive cloud-to-device messages that are targeted using the custom application 140, which will be described in detail in the following sections.

Figure 2:
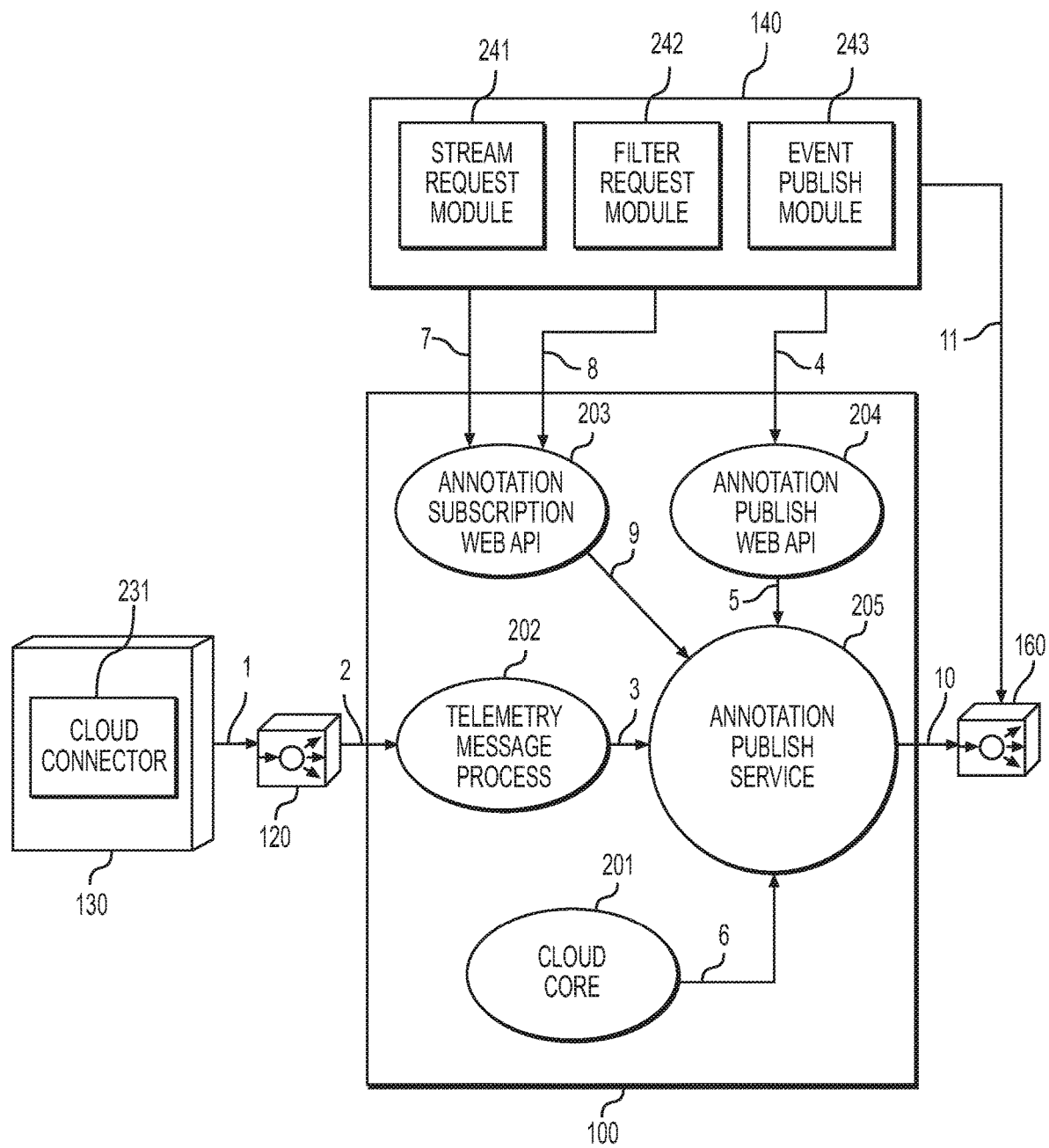
FIG. 2 is a schematic flow diagram of one embodiment of a method of providing an annotation service.

FIG. 2 is a schematic flow diagram of one embodiment of a method of providing an annotation service. In general, FIG. 2 depicts an edge device 130 and a custom application 140 disposed in communication with cloud platform 100. As shown in FIG. 2, edge device 130 may comprise a cloud connector 231. Custom application 140 may comprise a stream request module 241, a filter request module 242, and an event publish module 243. Cloud platform 100 may comprise a cloud core 201, a telemetry message process module 202, annotation subscription web API 203, annotation publish web API 204, and annotation publish service 205. Cloud platform 100 and custom application 140 may each be disposed in communication with at least one messaging end point 160.

For the sake of brevity, each of the edge devices 131, 132, 133 in FIG. 1 in the annotation network is represented as edge device 130 in FIG. 2. The edge device 130 may comprise a cloud connector 231. Cloud connector 231 may act as a bridge between the edge device 130 and the cloud platform 100. For instance, cloud connector 231 may receive data (e.g., history samples, events, alarms) at the edge device 130, construct them into messages, and send these messages to the cloud platform 100 via device messaging hub 120. Cloud connector 231 may also receive messages from the cloud platform 100 via device messaging hub 120 and process the messages for the edge device 130.

The reference characters 1-11 represent the sequence of steps performed for providing the annotation service, which will now be described in detail with reference to FIG. 2. As shown in FIG. 2, edge device 130 may be configured to generate and send messages to cloud platform 100 via device messaging hub 120 (Steps 1-2). Message types may comprise event, alarm, and time series data generated by the edge devices. Each message may be generated or formatted in accordance with a schema. To avoid having multiple edge devices generating messages of varying schemas and reduce processing expenses that might incur at cloud platform 100 for handling the messages of varying schemas, a common schema may be used by the cloud platform 100 and used for all, or at least a plurality of, messages generated throughout the edge devices. To achieve this, each edge device 130 may comprise a formatting module that generates and/or formats the messages to conform to the common schema. If there is an error in generating/formatting the message, or the edge device 130 is not configured with such formatting module, cloud platform 100 may be configured to perform a verification process to accept or reject the received messages. For instance, cloud platform 100 may reject a message if the message does not conform to the common schema. The cloud platform 100 may accept the message if the message conforms to the common schema.

A telemetry message process 202 may receive the incoming messages from the edge device 130 via device messaging hub 120 and process each message to be delivered to an appropriate service based on the message type. (Step 2). The processed messages may be moved to the annotation publish service 205 where rule-checking (e.g., filter authorization, filter application), filtering, and publishing processes are performed (Step 3), which are described in detail in the following sections. In addition to the messages generated by the edge device 130, the annotation publish service 205 may receive messages arriving from custom application 140 (Steps 4-5). The custom application 140 may comprise an event publish module 243, which enables the user of the custom application module to configure the custom application 140 to send or publish messages to the cloud platform 100 (Step 4). The event publish module 243 may connect and interact with the cloud platform 100 via annotation publish web API 204, which is a web application programming interface enabling the custom application 140 to publish messages to the annotation publish service 205 of the cloud platform 100 (Steps 4-5). Furthermore, the annotation publish service 205 may receive messages arriving from cloud core 201 of the cloud platform 100 itself for further processing and publishing (Step 6). The messages generated by and received from the cloud core 201 may include messages indicating system status (e.g., online/offline) and model change.

As described above, custom application 140 may also comprise a stream request module 241 and a filter request module 242. The stream request module 241 may be configured to communicate and interact with cloud platform 100 via the annotation subscription web API 203 to request at least one annotation stream to be created between the cloud platform 100 and at least one messaging end point 160 (Step 7). Even though FIG. 2 shows only one messaging end point 160, there may be multiple messaging end points that the custom application 140 may designate in the annotation stream request. The user of the custom application 140 may designate the messaging end point to which messages are sent. The filter request module 242 may be configured to communicate and interact with the cloud platform 100 via the annotation subscription web API 203 to apply an annotation filter to the annotation stream (Step 8). The user of the custom application 140 may request the annotation filter via the filter request module 242 by indicating specific properties, operators, and values that are applied to the messages collected at the annotation publish service 205, which will be explained in detail in the following sections. By using the annotation filter, the user is able to subscribe only to messages that the user is interested in. After receiving the stream and filter requests through the annotation subscription web API 203, the stream and filter information may be delivered to the annotation publish service 205 for further processing (Step 9).

As discussed above, the messages generated by the edge device 130, cloud core 201, and event publish module 243 may be sent to the cloud platform 100 and collected at the annotation publish service 205 for rule-checking, filtering, and publishing processes. The annotation publish service 205 may check the messages against rules stored in a storage to determine which messages to publish to a messaging end point 160. The annotation publish service 205 may also check the requested filters against the rules stored in the storage to determine whether the requested filters are authorized (e.g., whether the custom application 140 is authorized to subscribe to messages generated by the corresponding sources). The annotation publish service 205 may also process the stream request received from the annotation subscription web API 203, identify the messaging end point 160 from the request, and create an annotation stream to the messaging end point 160. Further, the annotation publish service 205 may apply the annotation filters, which have been authorized via the rule-checking process, to the annotation stream such that only the messages satisfying the conditions of the annotation filters are published to the messaging end point 160. The processes performed by the annotation publish service 205 are further explained in the following sections.

Once the annotation stream is created with the authorized filters applied, the messages that satisfy the conditions of the annotation filters may be published and delivered to the messaging end point 160 (Step 10). The custom application 140 may also be configured to listen to or receive the messages from the messaging end point 160 (Step 11), and react to the messages based on business requirements For example, the custom application may be configured to extract certain data from the body of a message and save it to a storage.

Each message received by the cloud platform 100 may be configured to conform to any one of two annotation types: Event and Alarm, so that the custom application 140 may subscribe to a specific annotation type. Further, as discussed above, the messages may be configured to conform to a common schema, which provides a common information model that covers all devices connected to the cloud platform 100. Having a common schema may allow the cloud platform 110 to easily de-serialize messages coming from all types of sources (i.e., devices, applications). For instance, each message may conform to the following schema:

| Property | Property Type | Property Description |
|---|---|---|
| Id | string | Id of annotation |
| CreatedTime | DateTimeOffset | Datetime offset when the annotation is created |
| CreatorId | string | Id of Creator, which is the agent responsible for creating the annotation |
| CreatorType | string | Type of Creator |
| GeneratorId | string | Id of the Generator, which is the agent responsible for generating the annotation to be transferred between client and server |
| GeneratorType | string | Type of Generator |
| TargetId | string | Id of the target of the annotation |
| TargetType | string | Type of target |
| TargetContext | string | Detail context of the target |
| Body | string | The detail or contents of the annotation |
| BodyProperties | string | List of key-value pairs for other properties of the annotation |
| EventType (or AlarmType) | string | Type of event (or type of alarm) |

Figure 3:
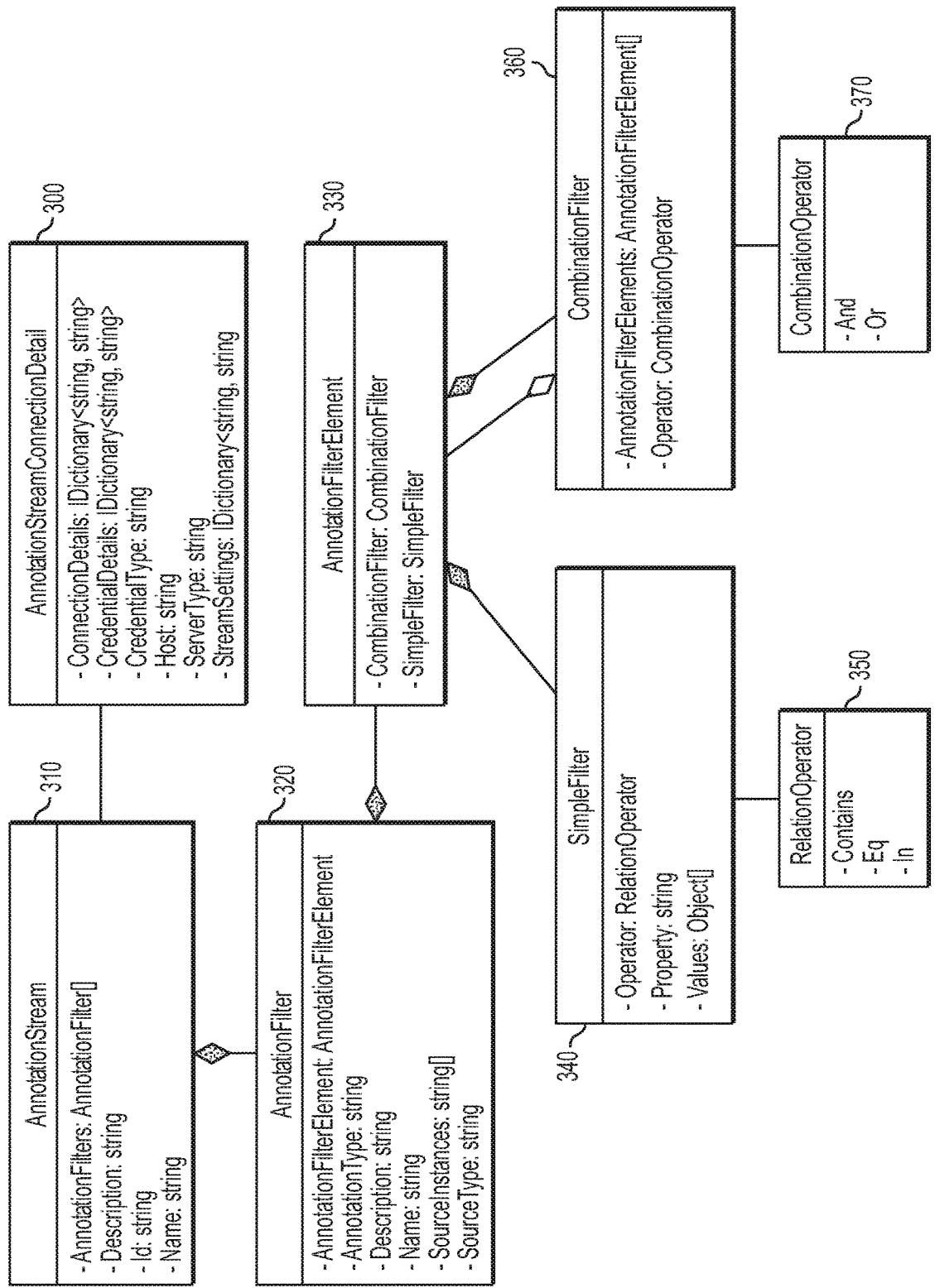
FIG. 3 is an exemplary embodiment of an annotation stream and annotation filters used by the annotation service.

FIG. 3 illustrates an exemplary embodiment of an annotation stream and annotation filters used by the annotation service. First, an annotation stream requested by the custom application 140 (or the user of the custom application 140) may define connection details (e.g., ConnectionDetails, CredentialDetails, CredentialType, Host, ServerType, StreamSettings) of the annotation stream, through which the subscribed messages are delivered to the messaging end point 160, as shown in AnnotationStreamConnectionDetail 300. Each annotation stream 310 generated in accordance with the connection details may be associated with one or more annotation filters (AnnotationFilters: Annotation Filter[ ]), a description of the stream (Description: string), an identifier (Id: string), and a name (Name: string).

Each annotation filter 320 associated with the annotation stream 310 may define what messages custom application 140 is subscribing to. In other words, annotation filter 320 may define what messages, among the messages collected at annotation publish service 205, are to be delivered to the messaging end point 160 specified in the connection details. For instance, the annotation filter 320 may specify an annotation filter element (AnnotationFilterElement: AnnotationFilterElement), an annotation type (AnnotationType: string), a description of the filter (Description: string), a name (Name: string), message source instances (SourceInstances: string [ ]), and a message source type (SourceType: string). The annotation type may indicate the type of message (e.g., alarm, or event) the custom application 140 is subscribing to. The message source type may indicate the type of message source (e.g., system, or model) the custom application 140 is subscribing to. Further, the message source instances may indicate the sources (i.e., devices, applications) of the messages the custom application 140 is subscribing to. The source instances may be represented by the system global unique identifiers (GUIDs) or model GUIDs.

As discussed above, the annotation filter 320 may be associated with an annotation filter element (AnnotationFilterElement: AnnotationFilterElement) which defines filtering rules by specifying desired properties and corresponding values to be applied to messages collected at the annotation publish service 205. The annotation filter element 330 may be one of two types: a simple filter (SimpleFilter:SimpleFilter) and a combination filter (CombinationFilter:CombinationFilter). A simple filter 340 may define an annotation type, a source type, and an annotation filter element comprising a property, a relation operator (e.g., Eq, In, or Contains), and a corresponding value. Alternatively, a combination filter 360 may define an annotation type, a source type, and multiple annotation filter elements connected by one or more combination operators (e.g., And, or Or), each annotation filter element including one or more properties, one or more relation operators (e.g., Eq, In, or Contains), and corresponding value(s).

For example, a simple filter 340 may be expressed in the following format: (AnnotationType=Event, SourceType=system1, EventType="access.Granted"). With this annotation filter, the annotation publish service 205 may publish, to the messaging end point 160 via the annotation stream 310, messages that are of "Event" type, generated by a system of type "system1," and that have the value of EventType property equal to "access.Granted."

On the other hand, a combination filter 360 may be expressed in the following format: (AnnotationType=Event, SourceType=system1, (EventType="access.Granted") Or (EvenType="access.Override.PermanentLocked" And TargetId Contains "point3")). With this annotation filter, the annotation publish service 205 may publish, to the messaging end point 160 via the annotation stream 310, messages that are of "Event" type;
    are generated by a system of type "system 1"; and
    satisfy any one or more of the following:
        have the value of EventType property equal to "access.Granted"; or
        have the value of EventType property equal to "access.Override.PermanentLocked" and have the value of TargetId property containing "point 3."

Figure 4A:
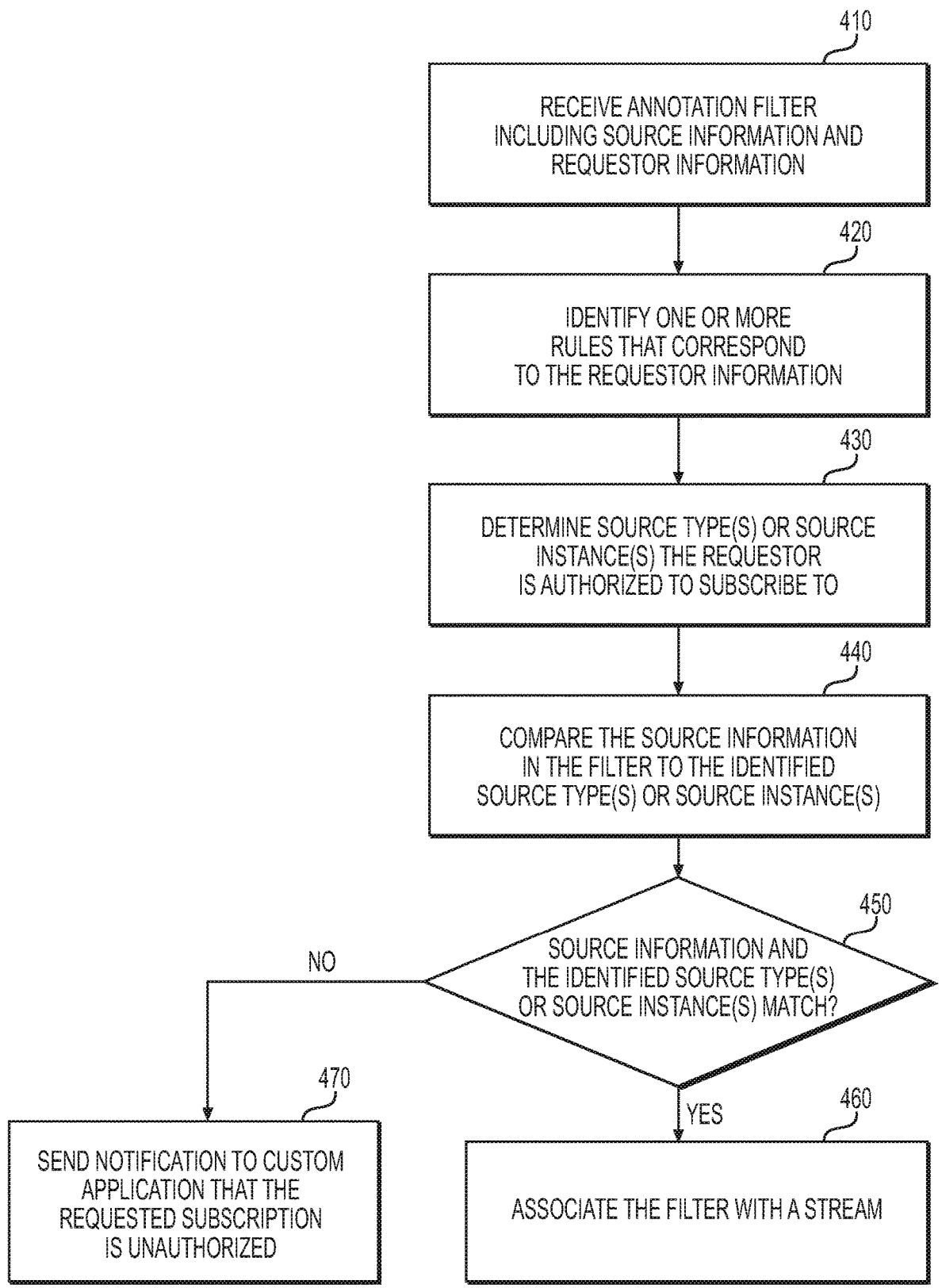
FIG. 4A is a flow chart illustrating one embodiment of a method of authorizing an annotation filter request.

FIG. 4A is a flow chart illustrating one embodiment of a method of authorizing an annotation filter. To ensure that the custom application 140 subscribes only to messages that the custom application 140 is authorized to, the annotation publish service 205 may check the annotation filter received from the custom application 140 against rules stored in a storage. In step 410, the annotation filter may be received at the annotation publish service 205. As discussed above, the annotation filter may indicate a source information, such as source type(s) and/or source instance(s), which defines the type of the source, or the specific instance of the source from which the interested messages are generated (i.e., source that the custom application wishes to subscribe to). The annotation filter may also include requestor information, such as requestor type and/or requestor instance, which identifies the custom application 140 from which the annotation filter request is generated.

In step 420, the annotation publish service 205 may start the rule-checking process by identifying one or more rules that correspond to the requestor information (e.g., requestor type or requestor instance) from the storage. The rules may be predetermined by a user or an administrator of the cloud platform 100 or the annotation service network. The identified one or more rules may specify which source type(s) and/or source instance(s) the requestor (identified by the requestor type and/or requestor instance) is authorized to subscribe to. In step 430, the source type(s) or source instance(s) to which the requestor is authorized to subscribe may be determined from the rules. In step 440, the source information of the filter may be compared to the source type(s) or source instance(s) determined from the rules. If the source information of the filter matches the source type(s) or source instance(s) determined from the rules at step 450, the annotation publish service 205 may associate the annotation filter with a stream in step 460. If the source information of the filter does not match the source type(s) or source instance(s) determined from the rules, the annotation publish service 205 may send a notification to the custom application 140 that the requested subscription is unauthorized in step 470.

Figure 4B:
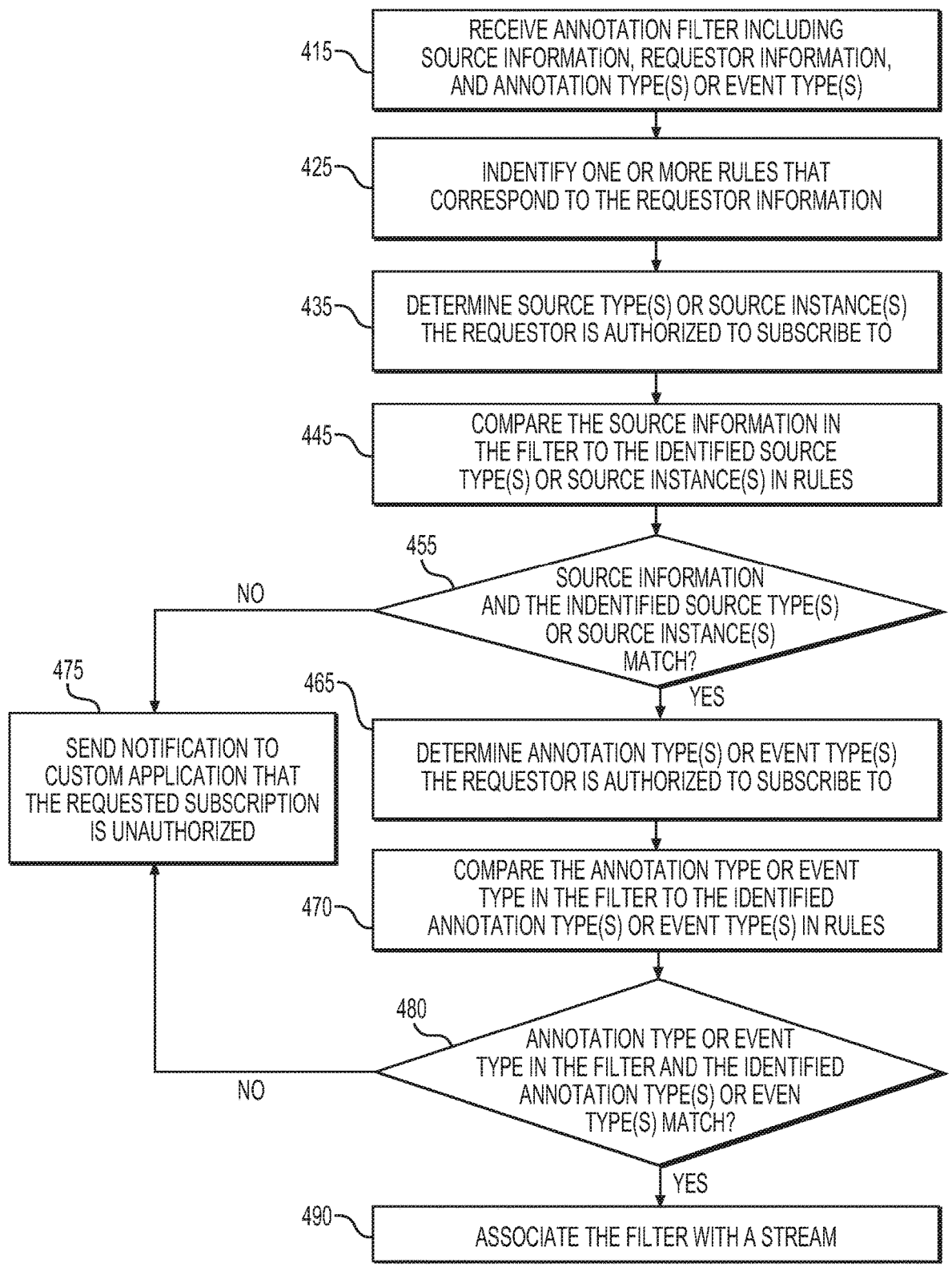
FIG. 4B is a flow chart illustrating another embodiment of a method of authorizing an annotation filter request.

FIG. 4B is a flow chart illustrating another embodiment of a method of authorizing an annotation filter. To ensure that the custom application 140 subscribes only to messages that the custom application 140 is authorized to, the annotation publish service 205 may check the annotation filter received from the custom application 140 against rules stored in a storage. In step 415, the annotation filter may be received at the annotation publish service 205. As discussed above, the annotation filter may indicate a source information, such as source type(s) and/or source instance(s), and a requestor information, such as requestor type and/or requestor instance. The annotation filter may also indicate an annotation type(s) (AnnotationType) or event type(s) (EventType).

In step 425, the annotation publish service 205 may start the rule-checking process by identifying one or more rules that correspond to the requestor information (e.g., requestor type or requestor instance) from the storage. The rules may be predetermined by a user or an administrator of the cloud platform 100 or the annotation service network. The identified one or more rules may specify which source type(s) and/or source instance(s) the requestor (identified by the requestor type and/or requestor instance) is authorized to subscribe to. The identified one or more rules may also specify which annotation type(s) and/or event type(s) the requestor is authorized to subscribe to.

In step 435, the source type(s) or source instance(s) to which the requestor is authorized to subscribe may be determined from the rules. In step 445, the source information of the filter may be compared to the source type(s) or source instance(s) determined from the rules. If the source information of the filter does not match the source type(s) or source instance(s) determined from the rules, the annotation publish service 205 may send a notification to the custom application 140 that the requested subscription is unauthorized in step 475. If the source information of the filter matches the source type(s) or source instance(s) determined from the rules at step 455, the annotation publish service 205 may proceed to step 465. In step 465, annotation type(s) or event type(s) to which the requestor is authorized to subscribe may be determined from the rules.

In step 470, the annotation type(s) or event type(s) indicated in the filter may be compared to the annotation type(s) or event type(s) determined from the rules. If the annotation type(s) or event type(s) indicated in the filter does not match the annotation type(s) or event type(s) determined from the rules, the annotation publish service 205 may send a notification to the custom application 140 that the requested subscription is unauthorized in step 475. If the annotation type(s) or event type(s) indicated in the filter matches the annotation type(s) or event type(s) determined from the rules, the annotation publish service 205 may associate the annotation filter to a stream in step 490.

Figure 5:
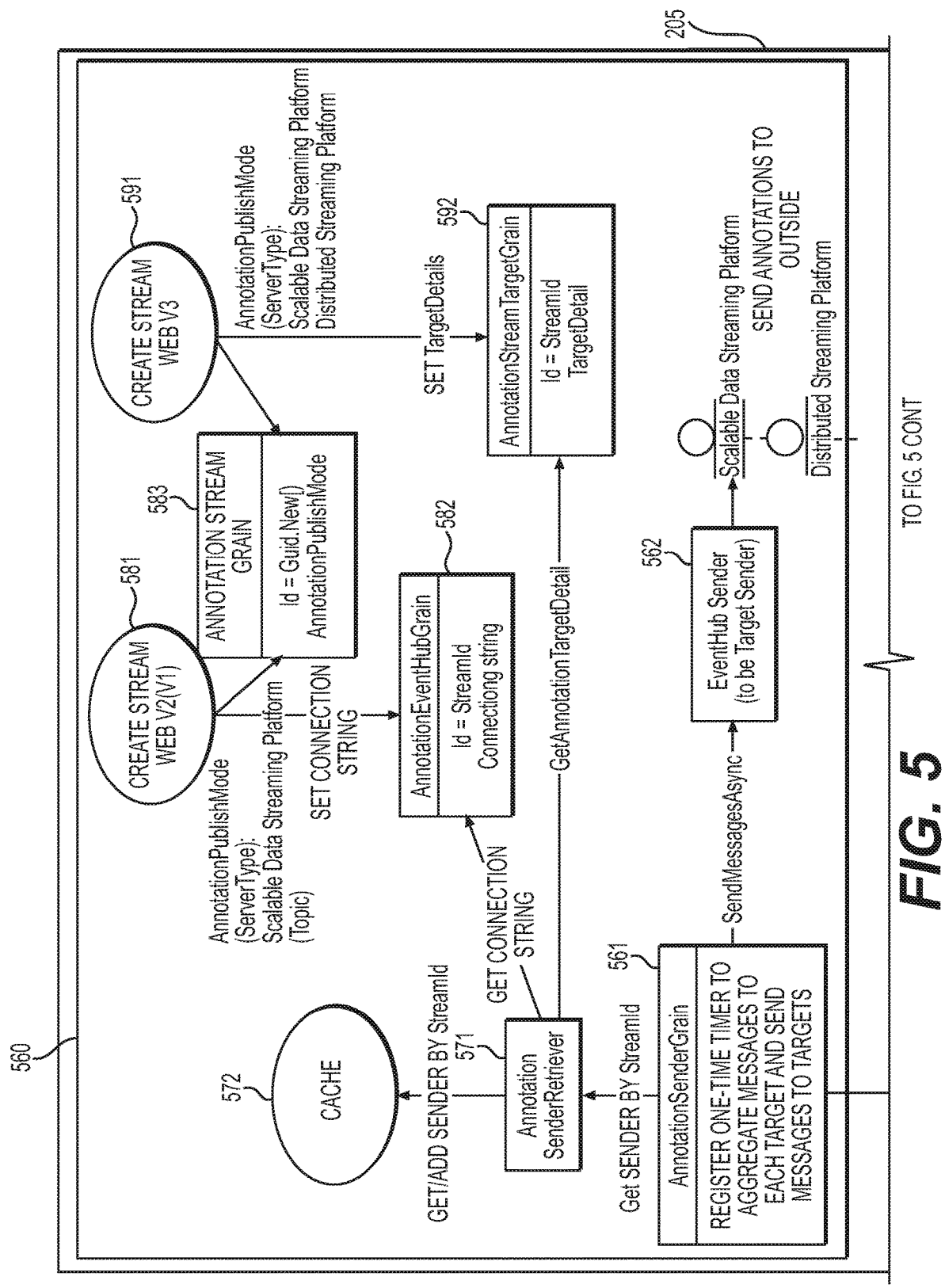
FIG. 5 is a schematic flow diagram of one embodiment of an annotation publish service.
Figure 5:
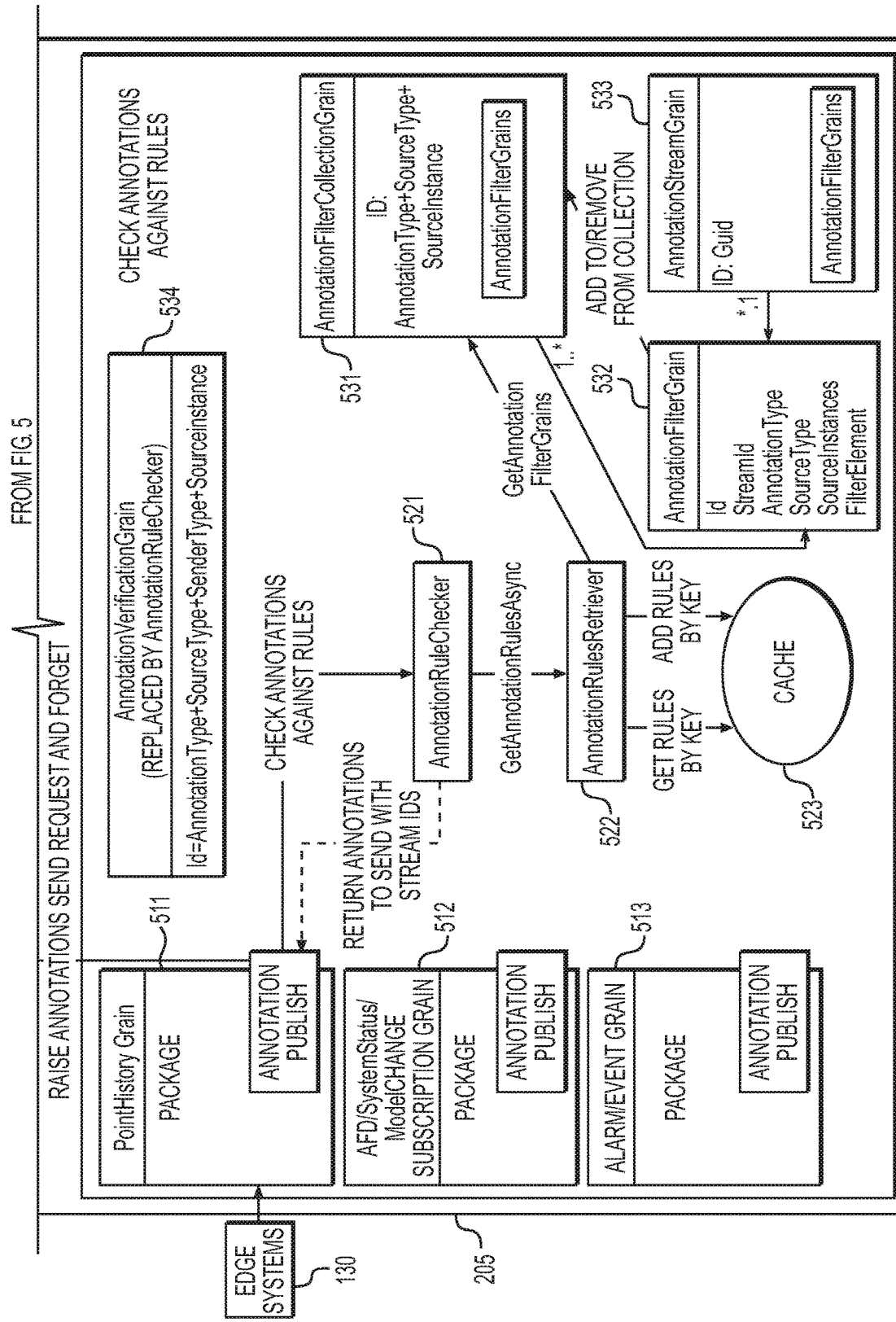

FIG. 5 further illustrates in detail the processes performed by the annotation publish service 205. In general, as shown in FIG. 5, annotation publish service 205 may comprise a rule-checking module 510 comprising an annotation rule checker 521, annotation rules retriever 522, and cache 523, and an annotation streaming module 560 comprising an annotation sender grain 561, an annotation sender retriever 571, a cache 572, a create stream web V2 581, a create stream web V3 591, and an event hub sender 562, all configured to filter and deliver messages to a messaging end point as described in more detail below.

First, a rule-checking module 510 of the annotation publish service 205 may receive messages from the edge device 130. As discussed above, the messages may be pre-processed by the telemetry message process 202 prior to being delivered to the rule-checking module 510. The rule-checking module 510 may check each type of message (e.g., PointHistory Grain 511, AFD/SystemStatus/ModelChange Subscription Grain 512, Alam/Event Grain 513) against rules stored in a storage 523 (e.g., cache) using annotation rule checker 521. As discussed above, rules may comprise filtering rules defined by annotation filter elements and specify desired properties and corresponding values to be applied to the messages collected at the annotation publish service 205. The rules that are applicable to the received messages may be retrieved from the storage 523 using annotation rules retriever 522 by key. Annotation rules retriever 522 may be configured to add rules to the storage by key. Furthermore, annotation rules retriever 522 may be configured to retrieve annotation filters (GetAnnotationFilterGrains) from an AnnotationFilterCollectionGrain 531. The AnnotationFilterCollectionGrain 531 may contain a plurality of annotation filters (AnnotationFilterGrains 532) that are received from the custom application 140. Once the annotation filters are retrieved by the annotation rules retriever 522, the annotation filters may be checked against the rules for authorization, as discussed above with respect to FIGS. 4A-4B. AnnotationVerificationGrain 534, which may be configured to verify the source of each message against the rules, may be replaced by the annotation rule checker 521. Unauthorized filters may then be removed from the AnnotationFilterCollectionGrain 531. Authorized filters may remain in the AnnotationFilter CollectionGrain 531 and may be associated with or added to the corresponding streams (AnnotationStreamGrain 533) specified by the custom application 140. The authorized filters may then be used by the annotation rule checker 521 to select messages to be published to the messaging end point 160. The selected messages may then associated with the stream identifier of the stream to which the filters are applied and a streaming request including the stream identifier may be forwarded to the annotation streaming module 560.

Turning now to the annotation streaming module 560, annotation sender grain 561 may register one-time timer to aggregate messages for each target (e.g., messaging end point 160) and send the aggregated messages to the target. First, the annotation sender grain 561 may retrieve sender information using the stream identifier via annotation sender retriever 571. The sender information may be added to or retrieved from a storage 572 (e.g., cache) by the annotation sender retriever 571. The annotation sender retriever 571 may retrieve connection string information from AnnotationEventHubGrain 582, which may contain the connection string information associated with the stream identifier. The annotation sender retriever 571 may also retrieve annotation target detail from AnnotationStreamTargetGrain 592, which may contain the target detail associated with the stream identifier. The connection string contained in the AnnotationEventHubGrain 582 may be set by create stream web V2(V1) 581 configured for scalable data streaming platform server type. Further, the target detail contained in the AnnotationStreamTargetGrain 592 may be set by create stream web V3 591 configured for scalable data streaming platform or distributed streaming platform server type. Using the information retrieved from the AnnotationEventHubGrain 582 and AnnotationStreamTargetGrain 592 (e.g., connection string, target detail), the annotation sender grain 561 may send the selected messages to the messaging end point 160 via the event hub sender 562.

Embodiments of the present disclosure concerning the message subscription systems and methods addresses the drawbacks of the prior approaches, using some of the techniques discussed above. In general, the message subscription approach in accordance with the embodiments of the present disclosure has at least the following distinguishable features that lead to significant improvements in the annotation service technology:

1) Annotation service based on a common schema for all, or at least a plurality of, messages generated from edge devices, allowing simple de-serialization of the messages and providing a clear picture to the custom application as to what content type(s) to subscribe to;

2) Centralized annotation subscription using web Application Programming Interface (API) at a cloud platform, providing a generic web API for custom applications to submit subscription requests (e.g., annotation stream and filter requests);

3) Flexible annotation filtering feature based on a common schema for all, or at least a plurality of, messages, with extensibility for custom applications to subscribe to messages of interest by generating simple or complex rule definitions (e.g., simple filter, combination filter); and 4) Secure annotation subscription via an authorization mechanism verifying subscription requests submitted from custom applications.

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable storage medium may form, or be included in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Thus, one embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media; a medium bearing a propagated signal detectable by at least one processor of one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

It should be appreciated that in the above description of exemplary embodiments of the invention, various features of the invention are sometimes grouped together in a single embodiment, FIG., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A computer-implemented method of subscribing to messages generated from a plurality of edge devices, comprising:
  determining, at a cloud platform, whether a plurality of messages from a plurality of edge devices complies with a common schema indicative of a common information model to represent telemetry data associated with the plurality of edge devices;
  receiving, at a cloud platform, the plurality of messages, wherein the plurality of messages complies with the common schema;
  receiving, at the cloud platform from a custom application, one or more requests to generate at least one annotation stream and at least one annotation filter, wherein the annotation stream defines connection details of the annotation stream through which one or more subscribed messages to which the custom application is subscribed are delivered to a messaging end point, and wherein, the annotation filter defines filtering rules to be applied to the one or more subscribed messages that are to be delivered to the messaging end point as specified in the connection details of the annotation stream;

publishing, by the cloud platform, one or more of the plurality of messages to the at least one annotation stream based on the one or more annotation filters;

determining whether each of the one or more annotation filters is authorized based on the filtering rules defined in the respective annotation filter of the received request;

in response to determining that an annotation filter of the one or more annotation filters is authorized, associating the annotation filter with the at least one annotation stream; and in response to determining that an annotation filter of the one or more annotation filters is not authorized, sending a notification to the custom application.

2. The computer-implemented method of claim 1, further comprising:

delivering one or more of the plurality of messages to the messaging end point indicated in the annotation stream request, wherein the common schema is the common information model comprising a property, a property type, and a property description, and wherein the plurality of messages further comprise messages received from a cloud core or the custom application.

3. The computer-implemented method of claim 1, wherein the annotation stream request and the annotation filter request are received via a web application programming interface (API) of the cloud platform.

4. The computer-implemented method of claim 1, wherein each of the plurality of edge devices comprises a formatting module configured to generate the plurality of messages to comply with the common schema.

5. The computer-implemented method of claim 1, wherein the one or more annotation filters specify one or more source types for the custom application to subscribe to, and wherein the defined one or more rules specify one or more source types the custom application is authorized to subscribe to; and wherein the determining whether each of the one or more annotation filters is authorized based on the defined one or more rules further comprises comparing the one or more source types specified in the one or more annotation filters to the one or more source types specified in the one or more rules.

6. The computer-implemented method of claim 1, wherein an annotation filter of the one or more annotation filters specifies at least one or more of:

an annotation type, a message source type, and a message source instance.

7. The computer-implemented method of claim 1, wherein an annotation filter of the one or more annotation filters is a combination filter specifying at least:

an annotation type, a source type, a property and a corresponding value based on the common schema, and a combination operator.

8. A system for subscribing to messages generated from a plurality of edge devices, comprising:

one or more processors; and a non-transitory computer readable medium storing instructions that, when executed by the one or more processors, cause the one or more processors to perform a method comprising:

determining, at a cloud platform, whether a plurality of messages from a plurality of edge devices complies with a common schema indicative of a common information model to represent telemetry data associated with the plurality of edge devices;

receiving, at a cloud platform, the plurality of messages, wherein the plurality of messages complies with the common schema;

receiving, at the cloud platform from a custom application, one or more requests to generate at least one annotation stream and at least one annotation filter, wherein the annotation stream defines connection details of the annotation stream through which one or more subscribed messages to which the custom application is subscribed are delivered to a messaging end point, and wherein, the annotation filter defines filtering rules to be applied to the one or more subscribed messages that are to be delivered to the messaging end point as specified in the connection details of the annotation stream;

publishing, by the cloud platform, one or more of the plurality of messages to the at least one annotation stream based on the one or more annotation filters, determining whether each of the one or more annotation filters is authorized based on the filtering rules defined in the respective annotation filter of the received request;

in response to determining that an annotation filter of the one or more annotation filters is authorized, associating the annotation filter with the at least one annotation stream; and in response to determining that an annotation filter of the one or more annotation filters is not authorized, sending a notification to the custom application.

9. The system of claim 8, wherein the at least one annotation stream delivers the one or more of the plurality of messages to the messaging end point indicated in the annotation stream request.

10. The system of claim 8, wherein the annotation stream request and the annotation filter request are received via a web application programming interface (API) of the cloud platform.

11. The system of claim 8, wherein the one or more annotation filters specify one or more source types for the custom application to subscribe to, and wherein the defined one or more rules specify one or more source types the custom application is authorized to subscribe to; and wherein the determining whether each of the one or more annotation filters is authorized based on the defined one or more rules further comprises comparing the one or more source types specified in the one or more annotation filters to the one or more source types specified in the one or more rules.

12. A non-transitory computer readable medium storing instructions that, when executed by one or more processors, cause the one or more processors to perform a method of subscribing to messages generated from a plurality of edge devices comprising:

determining, at a cloud platform, whether a plurality of messages from a plurality of edge devices complies with a common schema indicative of a common information model to represent telemetry data associated with the plurality of edge devices;

receiving, at a cloud platform, the plurality of messages, wherein the plurality of messages complies with the common schema;

receiving, at the cloud platform from a custom application, one or more requests to generate at least one annotation stream and at least one annotation filter, wherein the annotation stream defines connection details of the annotation stream through which one or more subscribed messages to which the custom application is subscribed are delivered to a messaging end point, and wherein, the annotation filter defines filtering rules to be applied to the one or more subscribed messages that are to be delivered to the messaging end point as specified in the connection details of the annotation stream;

publishing, by the cloud platform, one or more of the plurality of messages to the at least one annotation stream based on the one or more annotation filters;

determining whether each of the one or more annotation filters is authorized based on the filtering rules defined in the respective annotation filter of the received request;

in response to determining that an annotation filter of the one or more annotation filters is authorized, associating the annotation filter with the at least one annotation stream; and in response to determining that an annotation filter of the one or more annotation filters is not authorized, sending a notification to the custom application.

13. The non-transitory computer readable medium of claim 12, wherein the at least one annotation stream delivers the one or more of the plurality of messages to the messaging end point indicated in the annotation stream request.

14. The non-transitory computer readable medium of claim 12, wherein the annotation stream request and the annotation filter request are received via a web application programming interface (API) of the cloud platform.

15. The non-transitory computer readable medium of claim 12, wherein an annotation filter of the one or more annotation filters specifies at least one or more of:
an annotation type,
a message source type, and
a message source instance.

16. The non-transitory computer readable medium of claim 12, wherein an annotation filter of the one or more annotation filters is a combination filter specifying at least:
an annotation type,
a source type,
a property and a corresponding value based on the common schema, and
a combination operator.

* * * * *